O. C. KNIPE.
ANTIFRICTION JOURNAL BEARING.
APPLICATION FILED AUG. 5, 1904.
922,154.
Patented May 18, 1909.
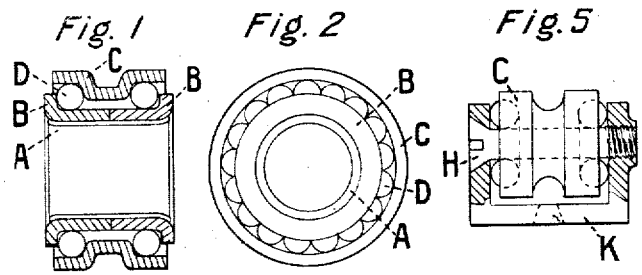
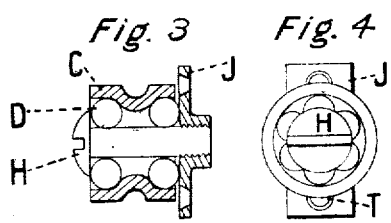
WITNESSES:
INVENTOR
ATTORNEY.

UNITED STATES PATENT OFFICE.

OLIVER C. KNIPE, OF NORRISTOWN, PENNSYLVANIA, ASSIGNOR TO ALFRED S. LEWIS, OF PHILADELPHIA, PENNSYLVANIA.

ANTIFRICTION JOURNAL-BEARING.

No. 922,154.  Specification of Letters Patent.  Patented May 18, 1909.

Application filed August 5, 1904. Serial No. 219,674.

*To all whom it may concern:*

Be it known that I, OLIVER C. KNIPE, a citizen of the United States, residing at Norristown, in the county of Montgomery and State of Pennsylvania, have invented a new and useful Antifriction Journal-Bearing, of which the following is a specification.

My invention relates to improvements in anti-friction journal bearings, and the objects are: First; to provide a circular antifriction journal bearing, in which the outer shell or rim shall be in one piece, with a transverse groove in its outer surface. Second: to provide a bearing in which the outer rim constitutes a groove, for a belt, chain, or rail and the inner rim constitutes a race way or track for rotating devices to revolve on. I attain these objects by the following mechanism illustrated in the accompanying drawings in which:

Figure 1 is a vertical section of an antifriction journal bearing, embodying one form of my improvement; Fig. 2 is an end view of the same; Fig. 3 is a vertical section, and, Fig. 4 an end view of the grooved outer shell mounted on a plate in combination with a bearing shaft, forming a bracket or pintle bearing; and Fig. 5 is a side view, part broken away, of a grooved outer shell mounted in a suitable frame and in connection with a central bearing shaft forming a roller suitable for attaching to a frame work of filing cabinets, etc., that have movable slides or drawers, making them much easier to operate.

I prefer to construct the outer shell C of the bearing Fig. 1, of a piece of sheet steel formed into a tube. This may be done by pressing a suitable tool against the tube while held in a divided mandrel and revolved. The metal is thus indented with a circular groove. The formed shell is easily removed by separating the two parts of the mandrel, thus constructing a form of shell rapidly and at one operation, with much less expense than if made from bar or casting, and more durable because more homogeneous in structure.

Having formed the outer shell or grooved casings, I place a sufficient number of balls or rollers, in each cup or race way formed at the ends, and insert the flanged tubes B, and pass a thimble or tube of soft metal A through both and expand the ends inside the flanged tubes, thus locking all the parts together and forming a complete anti-friction grooved wheel, or bushing for a wheel of large diameter.

Figs. 3 and 4 show an outer shell C mounted on a plate J and held in position by a threaded bolt H entering a tapped hole in plate J. When the balls are inserted and the bolt screwed into the plate, it will be seen the parts are all secured together and it forms a complete anti-friction roller and stand or bracket. The plate J may be tapped with screw-holes by which the device may be lagged fast to any suitable object on which it is to be used. It is well adapted for use as an anti-friction roller or caster on the drawers of desks or similar furniture, the groove in the roller adapting it to guide the drawer true on any suitable strip or rod which may be mounted on a fixed part of the framework.

Fig. 5 shows a grooved outer shell mounted in a frame which can be secured in many ways, such as to parting strips under cabinet drawers. The drawer resting on the rollers is easily drawn in or out. As a guide roller for use on wire cables or rods it can be secured in various ways, and the groove is of benefit in keeping it in alinement.

What I claim as my invention and desire to secure by Letters Patent of the United States, is:

1. A multiple ball bearing comprising a short cylindrical outer shell whose outer surface is formed for a tread surface, said shell having a narrow annular inwardly projecting indented rib intermediate the ends thereof, the sides of the rib and the inner surface of the shell forming race-ways for balls, said shell also having a groove on the outer surface thereof concentric with and in the same plane as the rib, circles of balls within the race-ways, and ball retaining means in contact therewith.

2. A multiple ball bearing comprising a short cylindrical outer shell whose outer surface is formed for a tread surface, said shell having a narrow annular inwardly projecting indented rib intermediate the ends thereof, the sides of the rib and the inner surface of the shell forming race-ways for balls, said shell also having a groove on the outer surface thereof concentric with and in the same plane as the rib, circles of balls within the raceways, ball retaining means formed in two parts, and means fastening the parts together.

3. A multiple ball bearing comprising a short cylindrical outer shell, said shell having a narrow annular inwardly projecting indented rib intermediate the ends thereof, the sides of the rib and the inner surface of the shell forming race-ways for balls, said shell also having a groove on the outer surface thereof concentric with and in the same plane as the rib, circles of balls within the race-ways, and ball retaining means in contact therewith.

4. A multiple ball bearing comprising a short cylindrical outer shell, said shell having a narrow annular inwardly projecting indented rib intermediate the ends thereof, the sides of the rib and the inner surface of the shell forming race-ways for balls; said shell also having a groove on the outer surface thereof concentric with and in the same plane as the rib, circles of balls within the raceways, ball retaining means formed in two parts, and means fastening the parts together.

In testimony whereof I have signed my name to this specification in the presence of two subscribing witnesses.

OLIVER C. KNIPE

Witnesses:
J. QUINCY ADAMS,
ADELAIDE O. N. KNIPE.